United States Patent
Un et al.

(10) Patent No.: US 9,008,657 B2
(45) Date of Patent: Apr. 14, 2015

(54) CENTRALIZED CONTEXT AWARENESS THROUGH NETWORK ASSOCIATION

(75) Inventors: Edward Ding-Bong Un, Beijing (CN); Henric Mattias Beermann, Beijing (CN); Kaiyan Tian, Beijing (CN); Hai Peng Fan, Beijing (CN); Jun Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 13/158,487

(22) Filed: Jun. 13, 2011

(65) Prior Publication Data

US 2012/0315901 A1   Dec. 13, 2012

(51) Int. Cl.
*H04W 4/02* (2009.01)
*H04W 4/04* (2009.01)
*H04W 4/20* (2009.01)

(52) U.S. Cl.
CPC ............ *H04W 4/04* (2013.01); *H04W 4/206* (2013.01)

(58) Field of Classification Search
CPC ......... H04W 4/02; H04W 88/08; H04W 4/00; H04W 12/06; H04W 48/08; H04W 48/16; H04W 60/00; H04W 76/02; H04W 12/08; H04W 84/12; H04W 48/00
USPC .................. 455/414.1–414.4, 404.1–404.2, 455/456.1–457
See application file for complete search history.

(56) References Cited

U.S. PATENT DOCUMENTS

| | | | |
|---|---|---|---|
| 5,835,061 A * | 11/1998 | Stewart | 342/457 |
| 6,571,221 B1 * | 5/2003 | Stewart et al. | 705/52 |
| 2002/0087384 A1 * | 7/2002 | Neifeld | 705/10 |
| 2005/0048990 A1 * | 3/2005 | Lauriol | 455/456.1 |

(Continued)

FOREIGN PATENT DOCUMENTS

WO   2009044322 A2   4/2009

OTHER PUBLICATIONS

Chen, et al., "LoSeCo: Location-based Search Computing for Pervasive Device Augmentation", Retrieved at <<http://ieeexplore.ieee.org/stamp/stamp.jsp?tp=&arnumber=4912830>>, Seventh Annual IEEE International Conference on Pervasive Computing and Communications—Workshops (PerCom Workshops), Mar. 9-13, 2009, pp. 6.

(Continued)

*Primary Examiner* — Vladimir Magloire
*Assistant Examiner* — Erica Navar
(74) *Attorney, Agent, or Firm* — Steven Spellman; Jim Ross; Micky Minhas

(57) ABSTRACT

A user's context is determined based on the wireless network to which the user is connected. Targeted information, based on the determined context, is then delivered to the user. A centralized mechanism associates identifiers of wireless access points to one or more providers, such as retail establishments, that have set up those access points and have been registered by the centralized mechanism. The providers also provide targeted information that they wish to have delivered to users whose context indicates that they are in or near that provider's store. The centralized mechanism further has information associating the wireless computing device with contact information that can be utilized to deliver targeted information. The targeted information can be delivered to the user via the wireless network, a cellular network or through other communicational mechanisms. The provider, or retail establishment, can also be informed of the presence of the user near its premises.

20 Claims, 5 Drawing Sheets

(56) References Cited

U.S. PATENT DOCUMENTS

| | | | | |
|---|---|---|---|---|
| 2006/0153122 | A1* | 7/2006 | Hinman et al. | 370/328 |
| 2006/0170591 | A1 | 8/2006 | Houri | |
| 2008/0189360 | A1 | 8/2008 | Kiley et al. | |
| 2008/0240016 | A1* | 10/2008 | Cai et al. | 370/328 |
| 2010/0279652 | A1 | 11/2010 | Sharp et al. | |
| 2010/0317371 | A1 | 12/2010 | Westerinen et al. | |
| 2011/0028160 | A1* | 2/2011 | Roeding et al. | 455/456.1 |
| 2011/0320539 | A1 | 12/2011 | Zhao et al. | |
| 2013/0097302 | A9* | 4/2013 | Khedouri et al. | 709/224 |

OTHER PUBLICATIONS

Duvander, Adam., "FourSquare Mashup Lets You Find Popular Places", Retrieved at <<http://blog.programmableweb.com/2010/06/25/foursquare-mashup-lets-you-find-popular-places/>>, Jun. 25, 2010, pp. 6.

Siegler, MG., "Spotted: Facebook's Check-In Functionality and New "Places" Tab", Retrieved at <<http://techcrunch.com/2010/05/09/facebook-places-check-in/>>, May 9, 2010, pp. 15.

Dash, Raj., "Gowalla: Find What You're Looking for With Location Search", Retrieved at <<http://www.socialtimes.com/2010/04/gowalla-find-what-youre-looking-for-with-location-search/>>, Apr. 16, 2010, pp. 7.

"Skyhook: How it works", Retrieved at <<http://www.skyhookwireless.com/howitworks/>>, Retrieved Date: Jan. 24, 2011, p. 1.

"International Search Report", Mailed Date: Dec. 27, 2012, Application No. PCT/US2012/040641, Filed Date: Jun. 3, 2012, pp. 9.

McCune, et al., "Seeing-Is-Believing: Using Camera Phones for Human-Verifiable Authentication", Nov. 2004, pp. 22.

* cited by examiner

CENTRALIZED CONTEXT AWARENESS THROUGH NETWORK ASSOCIATION

BACKGROUND

The convenience of wireless network connections, namely the convenience to maintain a communicational connection without physical attachment, has resulted in broad adoption of wireless networking technology. In particular, the vast majority of modern portable computing devices comprise some form of wireless communication hardware or wireless communication capabilities. As a result, because of the ubiquity of such capabilities, wireless networks have, likewise, been widely adopted and implemented. While the implementation of wireless networks in users' homes, and by their places of employment, enables users to enjoy the convenience of wireless communicational connections where they live and work, users are also increasingly coming to expect such conveniences when they travel. Significantly, many retail establishments offer wireless networking functionality for their patrons and visitors. For example, hotels and coffee shops often advertise that they provide wireless networking functionality and seek to distinguish themselves upon that basis. Increasingly, however, other retail establishments, such as restaurants, grocery stores, auto service centers, shopping malls, and professional services establishments also offer wireless networking functionality for their patrons and visitors.

The advantage to users of retail establishments offering wireless networking functionality is that those users can utilize that offered wireless networking functionality to access one or more computing devices that are communicationally coupled to a network to which the wireless networking functionality is also communicationally coupled. In particular, the wireless networking functionality typically offered by retail establishments enables users to access information available via the ubiquitous Internet and World Wide Web (WWW). Thus, users of the wireless networking functionality typically offered by retail establishments can, when they are communicationally coupled to such wireless networks, browse the Internet and WWW, visit one or more webpages and websites, and interact therewith.

While retail establishments can advertise their provision of wireless networking functionality in general, and can seek to entice customers to their establishments on such a basis, they are limited in their ability to utilize such functionality to directly target advertisements to their customers. Some retailers offer free wireless networking functionality but then limit the utilization of such functionality to only allow users to obtain information associated with that retailer. For example, an airport could offer free wireless networking functionality, but can limit users of such functionality to only obtain information provided by the airport, such as by limiting those users to only being allowed to visit a website that is hosted by the airport and that provides information relevant to the airport, such as arrival and departure information. While such an idea may work well for an airport, visitors to other retail establishments may be disappointed when the wireless networking functionality offered by such a retail establishment only enables those users to visit that retail establishment's webpage, for example.

In some cases, a "landing page" may be presented to users seeking to access wireless networking functionality. As will be recognized by those skilled in the art, such a landing page can be a webpage that is presented by an access point, or other like device that is sourcing the wireless networking functionality, that can act as a mechanism, or interface, through which a user can be prompted to accept certain terms and conditions of the utilization of the provided wireless networking functionality, or through which a user can be prompted to enter authentication information, such as, for example, if the provided wireless networking functionality is protected. Such a landing page can be utilized to target and deliver advertisements to visitors of a retail establishment, though, in practice, such an idea is only practical for single-establishment retailers. For example, an owner of a single coffee shop, that has only one wireless access point providing wireless networking functionality to its customers, could implement such an idea, and have that single wireless access point present a landing page that not only acts as a gateway to accessing the wireless networking functionality, but that can also provide advertisements to a user, such as, for example, a listing of daily specials. A nationwide coffee shop chain, however, would be required to individually implement such functionality on every single access point in every single retail establishment that is part of such a chain throughout the entire country. As will be recognized by those skilled in the art, such an effort is likely to cost more than any attendant benefit derived therefrom and, as a result, is not likely to be undertaken.

SUMMARY

In one embodiment, a centralized mechanism can determine a user's context, such as which retail establishment that user is currently visiting, based on the wireless network to which such a user is communicationally coupled. Based on the determined user's context, the centralized mechanism can identify targeted information to be presented to the user, and can present such targeting information to the user.

In another embodiment, providers of wireless networking functionality, such as retail establishments, can register with a centralized mechanism such that unique identifiers of the wireless access points utilized by such providers to provide the wireless networking functionality can be associated with those providers. Subsequently, a determination that a user is communicationally coupled to one of those wireless access points can enable a centralized mechanism to determine that that user's context includes the user's presence in or near the provider, such as the retail establishment, that registered that wireless access point.

In a further embodiment, providers of wireless functionality, such as retail establishments, can further register, with a centralized mechanism, targeted information that those providers seek to have delivered to users whose contexts include users' presence in or near that provider, such as in or near that provider's retail establishment. The determination, by the centralized mechanism, of a user's context based on the wireless network to which such a user is communicationally coupled can, thereby, enable the centralized mechanism to also identify targeted information that is to be presented to such user.

In a still further embodiment, targeted information can be presented to the user either through the wireless communicational connection made by such a user that enabled the determination of the user's context in the first place, or it can be presented to the user through other communicational mechanisms, including cellular voice, text, and data communication mechanisms. Appropriate contact information, to facilitate presentation of targeted information through such other communicational mechanisms, can be provided by the user themselves when registering with a centralized mechanism, or when executing an appropriate application program, or other collection of computer-executable instructions, on a wireless computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
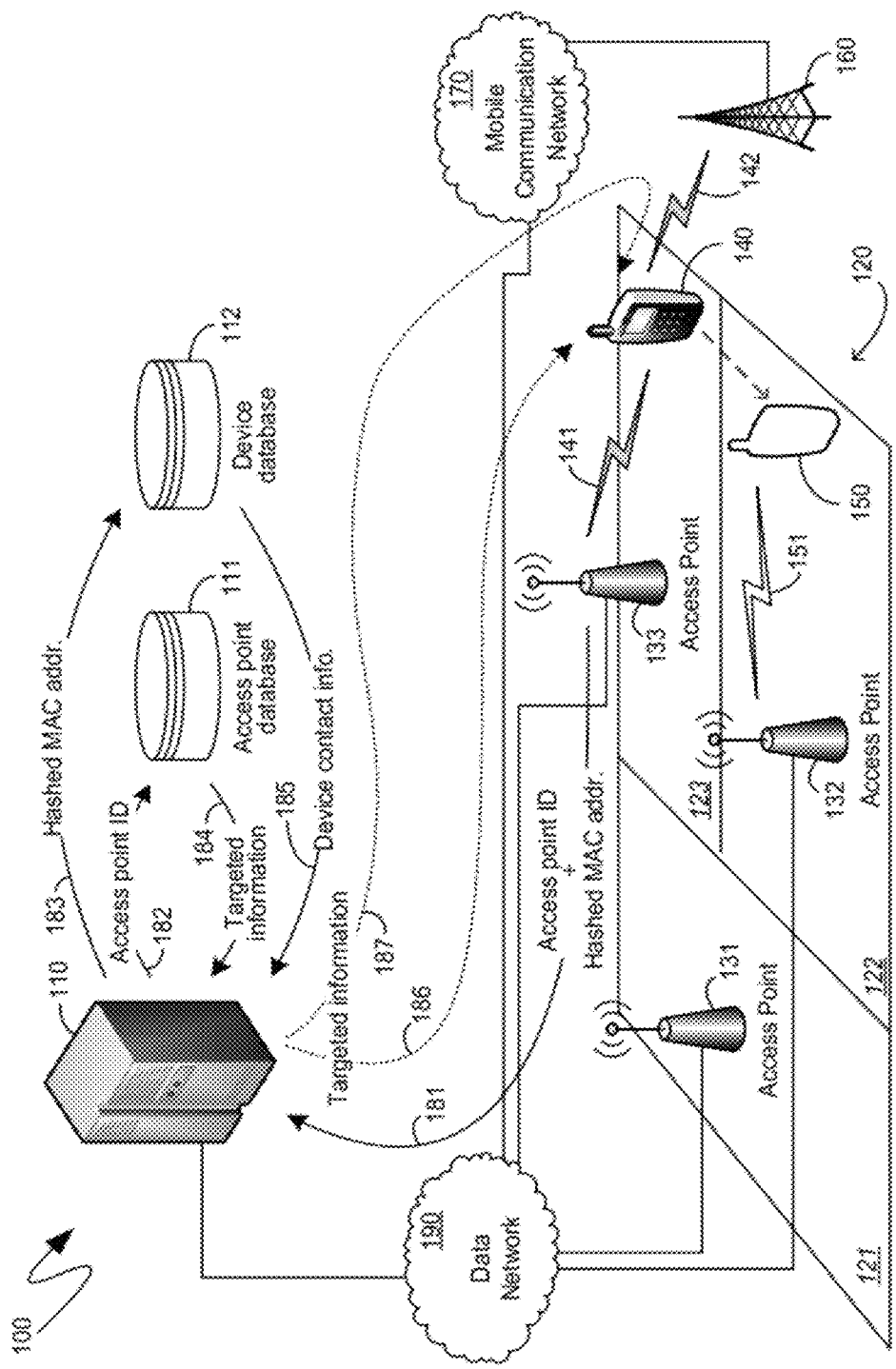
FIG. 1 is a block diagram of an exemplary environment within which a correlation between wireless communicational connections and context can be obtained and utilized.

The following description relates to mechanisms for determining a user's context based on the wireless network to which such a user is communicationally coupled and identifying targeted information, based on the determined context, to be delivered to the user. A centralized mechanism can comprise information associating the identifiers of one or more access points, providing wireless network functionality, to one or more providers, such as retail establishments, that have set up those access points. Such information can be provided by the retail establishments, which can also provide targeted information that they wish to have delivered to users communicationally coupled to the wireless networks provided by those wireless network access points. The centralized mechanism can further comprise information associating one or more wireless computing devices with contact information, or other like information, which can be utilized to deliver targeted information. The context of the user can be determined based on the wireless access point to which such a user's wireless computing device is communicationally coupled. Based on that context, targeted information can be identified that is to be delivered to the user. Such targeted information can be delivered to the user through the user's wireless computing device, either via the wireless network to which such a device's communicational coupling enabled the contextual determination, or through other communicational mechanisms.

For purposes of illustration, the techniques described herein make reference to wireless networks, but such references are strictly exemplary and are not intended to limit the mechanisms described to only short-range wireless networks. Indeed, the techniques described are equally applicable to any wireless communicational connection. Additionally, for purposes of illustration, the techniques described herein make reference to wireless networks that are utilized to provide a communicational connection to a further, broader, network of computing devices. However, the techniques described do not require such connectivity and are equally applicable to communications within local area, or wide area, networks.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 100 is shown, comprising an environment 120 within which the context of a user, such as that user's location within the environment 120, can be utilized to provide targeted information to that user, such as through a wireless computing device that the user can carry with them. For example, the environment 120 can be a retail environment, such as a mall, a store, a supercenter, or other like retail environment. For purposes of illustration, the retail environment 120 is shown as comprising three different retail establishments, namely the retail establishments 121, 122 and 123. For example, if the retail environment 120 were a shopping mall, retail establishments 121, 122 and 123 can represent different stores, such as a coffee shop, an auto care center, and a shoe store, or other like retail establishments, that can be in the shopping mall retail environment 120.

Each of the retail establishments 121, 122 and 123 can comprise, such as for the convenience of their patrons, independent wireless network functionality. More specifically, the retail establishment 121 can provide wireless network functionality for its patrons through the access point 131. A separate, independent wireless network can be established to provide wireless network functionality for the patrons of the retail establishment 122 by the access point 132. Similarly, yet another separate, independent wireless network can be established by an access point 133, which can provide wireless functionality for the patrons of the retail establishment 123. Each of the access points 131, 132 and 133 can further be communicationally coupled to a data network 190 to which other computing devices can, likewise, be communicationally coupled. In one embodiment, the data network 190 can represent the Internet, the World Wide Web, or other like large area network. In other embodiments, however, the data network 190 can represent any collection of network computing devices irrespective of size and geographic scope. Traditionally, the communicational connections between the access points 131, 132 and 133, and the data network 190, can be established by internetwork routing devices, though, for ease of visual presentation, such devices are not specifically illustrated the system 100 of FIG. 1.

A user visiting one of the retail establishments of the retail environment 120, such as, for example, a user visiting the retail establishment 123, can utilize a wireless computing device, such as the wireless computing device 140, to establish a communicational connection 141 to the wireless access point 133 provided by the retail establishment 123. Should such a user leave the retail establishment 123 and, instead, travel to another retail establishment, such as, for example, the retail establishment 122, then the user's wireless computing device can establish a communicational connection 151 with the access point 132.

Additionally part of the system 100 of FIG. 1 can be one or more server computing devices, represented by the server computing device 110, that can maintain communicational connections to an access point database 111 and a device database 112. Although illustrated as separate databases, the information contained in the access point database 111 and the device database 112 can be amalgamated into a single database, or can be spread out across multiple distributed databases. The illustrated access point database 111 and device database 112 are, therefore, shown as separate databases strictly for ease of visual presentation and for reference in the detailed descriptions provided below. In addition to the communicational connections to the databases 111 and 112, the server computing device 110 can be communicationally coupled with the data network 190 such that, via the data network 190, communications can be exchanged between the server computing device 110, the access points 131, 132 and 133, and any wireless computing devices communicationally coupled to those access points, such as, for example, the wireless computing device 140.

In one embodiment, when a user enters a retail establishment, such as the retail establishment 123, and communicationally couples a wireless computing device that the user may have with them, such as, for example, the wireless computing device 140, the access point 133 can notify the server computing device 110 of the establishment of the communicational connection 141 between it and the wireless computing device 140. More specifically, and as illustrated by the communication 181, shown in the system 100 of FIG. 1, the access point 133 can provide, to the server computing device 110, an identifier of the access point 133, and an identifier of the wireless computing device 140 that has established the communicational connection 141 with the access point 133. In the embodiment illustrated in the system 100 of FIG. 1, the identifier of the wireless computing device 140, which can be provided by the access point 133 to the server computing device 110, can be a hashed Media Access Control layer (MAC) address. As will be recognized by those skilled in the art, a MAC address can be a unique identifier of a computing device and can, also, be obtained by an access point, such as the access point 133. However, in other embodiments, other unique identifiers of the wireless computing device 140 can be provided, by the access point 133, to the server computing device 110, via the communication 181.

Upon receiving the communication 181, the server computing device 110 can reference the access point database 111 utilizing the access point identifier that was provided via the communication 181. Thus, as shown by the communication 182, the server computing device 110 can obtain, from the access point database 111, targeted information, such as that returned by the communication 184. More specifically, the server computing device 110 can attain, from the access point database 111, information about the access point 133 whose identifier was provided in the communication 181. Such information can include the name of the retail establishment 123 that has set up the access point 133 in order to provide wireless network functionality to its customers, as well as the location of that establishment, or any other information that that establishment registered, such as with the server computing device 110, for storage in the access point database 111. Additionally, such information can represent a context of a user of the wireless computing device 140, since such a wireless computing device is communicationally coupled to the access point 133.

Such contextual information can then be utilized, such as by the server computing device 110, to obtain targeted information that is relevant to that context. For example, in one embodiment, the retail establishment 123, when registering the access point 133 with the server computing device 110, can provide targeted information, in addition to the access point identifier, and information about the retail establishment 123. Such targeted information can include information that the retail establishment 123 seeks to present to customers on or near its premises, such as, for example, coupons, special offers, and other like targeted advertising. Such targeted information can then be stored in the access point database 111 and can be obtained, by the server computing device 110, via the access point identifier provided via the communication 182.

In another embodiment, the targeted information can be stored, such as by the retail establishment 123, in a database that is accessible to the server computing device 110. In such another embodiment, rather than receiving the targeted information directly from the access point database 111, such as is illustrated by the communication 184, the server computing device 110 can, instead, merely receive contextual information from the access point database 111, such as, for example, the name of the retail establishment 123 that has set up the access point 133 whose identifier was provided to the access point database 111 via the communication 182. Utilizing such retail establishment identifying information, which can have been provided to the server computing device 110, via the communication 184, from the access point database 111 instead of the targeted information, the server computing device 110 can reference this other database, that can be maintained, or utilized, by the retail establishment 123 and, can, by referencing the retail establishment identifying information, obtain relevant targeted information from this other database. In such a manner, a retail establishment, such as the retail establishment 123, need only register an access point, such as the access point 133, with the server computing device 110, and changes to targeted information associated with that retailer can be updated and managed through a database that the retail establishment can maintain, or at least have access to, and which the server computing device 110 can reference when needed.

Ultimately, however, the server computing device 110 can obtain targeted information, such as via the communication 184, by utilizing an access point identifier to identify an access point, such as the access point 133, and a retail establishment associated with such an access point, such as the retail establishment 123 that established the access point 133 in order to provide wireless network functionality to its customers. Additionally, the server computing device 110 can utilize the identification of the wireless computing device 140, such as the hashed MAC address, to obtain contact information with which to send the targeted information to that wireless computing device 140. For example, in one embodiment, the server computing device 110 can reference a device database 112 utilizing the hashed MAC address, as illustrated by the communication 183, and can receive, from the device database 112, device contact information, such as is illustrated by the communication 185. Utilizing the device contact information received by the communication 185, the server computing device 110 can provide the targeted information to the wireless computing device 140, such as is illustrated by the communications 186 and 187.

In one embodiment, the provision of the targeted information, by the server computing device 110, to the wireless computing device 140, can occur through the wireless network communicational connection 141 whose establishing triggered the above-described processing in the first place. For example, the device contact information, received by the server computing device 110, via the communication 185, from the device database 112, can have specified contact information that comprised an address, assigned to the wireless computing device 140, by the access point 133 or the internetwork routing device communicationally coupled thereto, together with another address, such as of that internetwork routing device. Thus, in such an embodiment, the device contact information can enable the server computing device 110 to provide the targeted information to the wireless computing device 140 via a communicational pathway represented by the communication 186 shown in the system 100 of FIG. 1, namely the provision of the targeted information, via the data network 190, through the access point 133 to the wireless computing device 140.

In another embodiment, the provision of the targeted information, by the server computing device 110, to the wireless computing device 140, can occur through other communicational mechanisms, such as those involving a mobile communication network 170. For example, the device contact information, received by the server computing device 110, via the communication 185, from the device database 112, can specify contact information that comprises a phone number, such as a mobile cellular telephone number, that can be assigned to the wireless computing device 140, such as by a mobile cellular telephone provider. In such an example, the server computing device 110 can provide the targeted information to the wireless computing device 140, by, for example, sending a text message to the phone number of that wireless computing device, which the server computing device 110 can have received as the device contact information via the communication 185. Alternatively, as another example, the server computing device 110 can provide the targeted information to the wireless computing device 140 by providing a voice telephone call to the phone number of that wireless computing device. The communication 187, shown in the system 100 of FIG. 1, is meant to represent such communications that can pass through a mobile communication network 170, such as a cell phone network, and can be delivered to the wireless computing device 140, such as through a cellular connection 142 maintained with one or more cellular communication towers 160. The communications 186 and 187 are illustrated in the system 100 of FIG. 1 with dashed lines to indicate that they are alternatives of one another.

In a still further embodiment, one or more application programs, or other collections of computer-executable instructions, executing on the wireless computing device 140 can be in communication with one or more server computing devices, such as dedicated message delivery server computing devices. Such application programs and servers can be maintained by entities separate and apart from the server computing device 110 and can be utilized, by the server computing device 110, to deliver the targeted information to the wireless computing device 140. For example, an application program executing on the wireless computing device 140 can be configured to remain in communication with a dedicated message delivery server computing device such that, when that dedicated message delivery server computing device receives the targeted information from the server computing device 110, the application program executing on the wireless computing device 140 can be notified of such targeted information, and it can present the targeted information to the user of the wireless computing device 140.

Were the wireless computing device 140, and the user utilizing such wireless computing device, to leave the retail establishment 123 and instead proceed to the location 150 in the retail establishment 122, a new communicational connection 151 can be established between the wireless computing device 140, now in the location 150, and the access point 132 that can be provided by the retail establishment 122 to provide wireless networking functionality to its customers. In such a case, the access point 132 can provide an access point identifier and the hashed MAC address, analogous to those provided by the access point 133, via the communication 181, to the server computing device 110. The server computing device can then undertake processing analogous to that described in detail above except, that in providing the new access point identifier to the access point database 111, the server computing device 110 can identify a different set of targeted information, such as, for example, advertisements or special offers that may be offered by the retail establishment 122. In such a manner a user of the wireless computing device can receive targeted information such as special offers, coupons, notifications, and other like advertisements, from retailers that that user is currently visiting, or is proximally located thereto, by virtue of and identification of the user's context, including their location, via an identification of the wireless network to which that user's wireless computing device is currently communicationally coupled.

In one embodiment, although not specifically illustrated in the system 100 of FIG. 1, the targeted information provided by the server computing device 110, can comprise targeted information that is provided, not to a user, such as through their wireless computing device, but rather to a computing device associated with the retail establishment itself. For example, if the retail establishment 123 was a shoe store, a computing device in the store can be utilized to receive targeted information from the server computing device 110. In such an embodiment, the targeted information that can be directed to a store can be identification of the user whose wireless computing device was detected as being communicationally coupled to an access point set up by that store. Returning to the above example, the shoe store 123 can be notified that the user of the wireless computing device 140 has established a communicational connection with its access point 133, and an employee of that store could then have ready for that user, for example, shoes that that user may have ordered, or may have dropped off for repair, such that by the time the user approaches the counter, the item for which they originally entered the store can already be waiting for them, thereby improving the user's satisfaction and increasing the customer service capabilities of the retail establishment.

Figure 2:
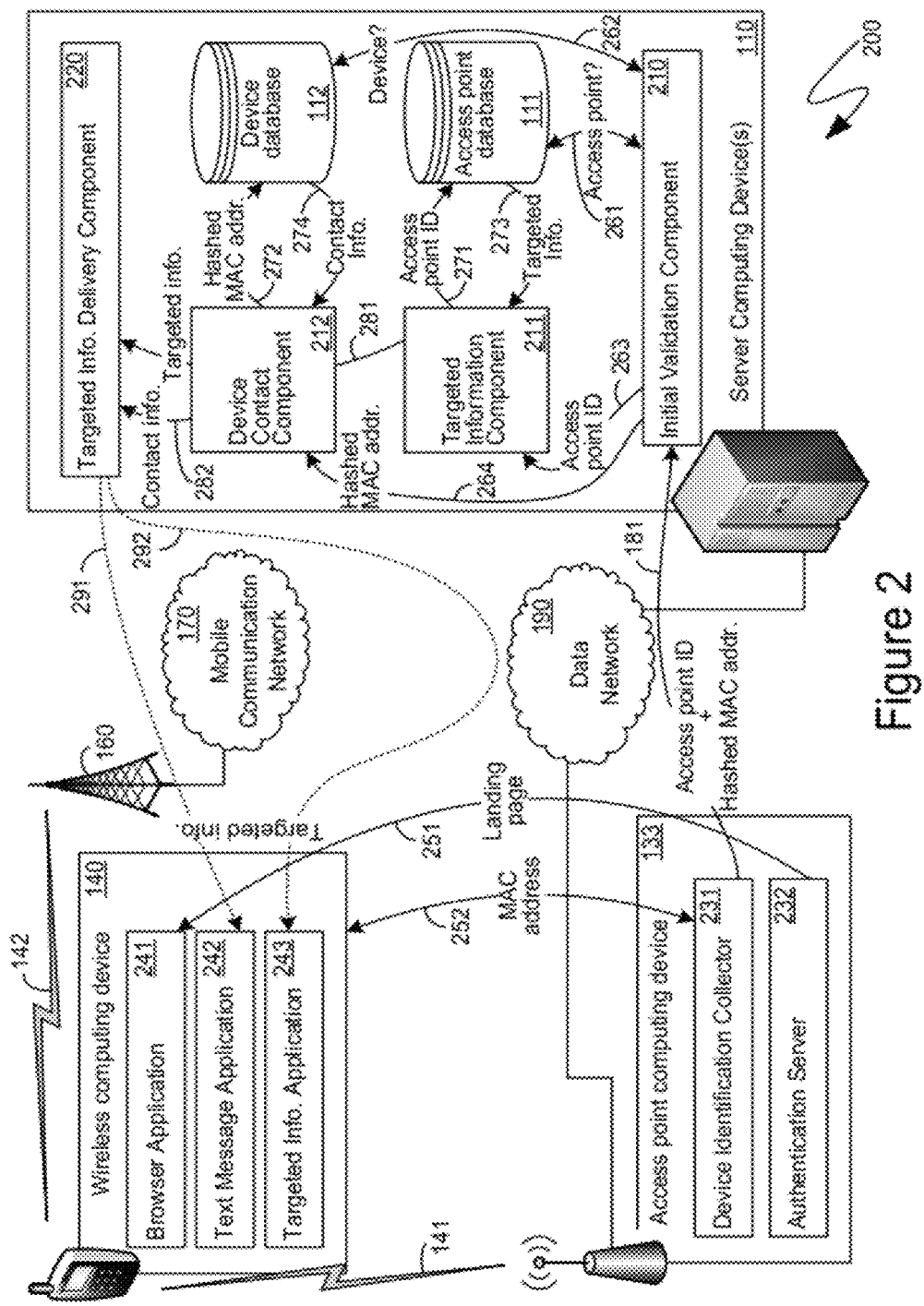
FIG. 2 is a block diagram of an exemplary computing device that can provide for, and utilize, a correlation between wireless communicational connects and context.

Turning to FIG. 2, the system 200 illustrated therein illustrates the exemplary wireless computing device 140, the exemplary access point computing device 133, and the exemplary one or more server computing devices 110 in greater detail. More specifically, and as shown by the system 200 of FIG. 2, exemplary access point computing device 133, which provides a more detailed illustration of the access point 133 described above, can comprise a device identification collector 231 and, optionally, an authentication server 232, which can either be part of the access point computing device 133 or can be, itself, a separate computing device that is communicationally coupled with the access point computing device 133. In an optional embodiment, when a wireless computing device, such as the wireless computing device 140, establishes a wireless communicational connection with the access point computing device 133, such as the wireless communicational connection 141, the access point computing device 133 can provide, to the wireless computing device 140, a landing page, as illustrated by the communication 251. As will be recognized by those skilled in the art, typically, the landing page is provided to a browser application 241 executing on the wireless computing device 140, such as, for example, when the browser application 241 first attempts to access some data utilizing the wireless communication connection 141. In one embodiment, the landing page provided by the authentication server 232, of the access point computing device 133, can present information to the user of the wireless computing device 140, informing the user that the access point computing device 133 may transmit identification information identifying the wireless computing device 140 to one or more server computing devices, such as the server computing device 110. In an analogous embodiment, the landing page provided by the authentication server 232, such as via the communication 251, can further comprise a request for authorization, from the user of the wireless computing device 140, to perform such an action.

The access point computing device 133 can then, as indicated previously, obtain an identification of the wireless computing device 140. For example, as illustrated by the system 200 of FIG. 2, the device identification collector 231 can request, and obtain, a MAC address of the wireless computing device 140. That MAC address, or other identification of the wireless computing device 140, can be combined with an identification of the access point computing device 133 and transmitted to the server computing device 110, such as via the communication 181 described previously.

In one embodiment, the communication 181 can be received by an initial validation component 210 that can execute on one or more server computing devices, such as the server computing device 110, in order to verify that the communication 181 comprises information which the server computing device 110 can meaningfully process. In other embodiments, however, no such explicit initial validation component 210 exists and, instead, the communication 181 can be directed to the components 211 and 212, such as in the manner described in detail below.

In an embodiment with an initial validation component, the initial validation component 210 can verify that the information received, such as via the communication 181, references access points and wireless computing devices that have registered with the server computing device 110. For example, as illustrated by the system 200 of FIG. 2, the initial validation component 210 can, via the communication 261, with the access point database 111, verify that an access point having the access point identifier that was received via the communication 181 has, in fact, been registered and information about such an access point is contained in the access point database 111. Similarly, as another example, the initial validation component 210 can, such as via the communication 262, likewise communicate with the device database 112 to verify that the device database 112 comprises any information about a device having the device identifier that was received by the communication 181.

If the initial validation component 210 confirms that the information received via the communication 181 can be meaningfully dealt with by the server computing device 110, it can provide the access point identifier, received via the communication 181, to a targeted information component 211, such as via the communication 263, as shown. Similarly, initial validation component 210 can, likewise, provide the wireless computing device identifier, such as the hashed MAC address, received via the communication 181, to a device contact component 212, as illustrated by the communication 264. As indicated previously, in another embodiment where the server computing device 110 comprises no such initial validation component 210, the information from the communication 181 can be directly provided to the device contact component 212 and the targeted information component 211.

The targeted information component 211 can utilize the access point identifier, such as the one received via the communication 263 from the initial validation component 210, to identify targeted information that can be presented to a wireless computing device. For example, the targeted information component 211 can provide the access point identifier to the access point database 111, such as via the communication 271. In one embodiment, the targeted information component 211 can receive, from the access point database 111, a name of a retail establishment that can be associated with the access point computing device 133 whose access point identifier was provided via the communication 271. Again, as indicated previously, such information can be placed into the access point database 111 when a retail establishment registers an access point with a centralized service providing the functionality described herein. The targeted information component 211 can, based on such information received from the access point database 111, determine that a user of the wireless computing device 140 can have a context associated with the retail establishment identified by the access point database 111.

In one embodiment, the targeted information component 211 can reference information associated with such a retail establishment to identify targeted information that can be presented to a user. For example, such information can be accessible through the access point database 111 and, as such, the provision of the access point identifier, to the access point database 111, by the targeted information component 211, such as via the communication 271, can result in the targeted information component 211 receiving the targeted information directly from the access point database 111, such as is illustrated by the communication 273. In other embodiments, however, the targeted information component 211 can only receive, from the access point database 111, identification of the retail establishment associated with the access point whose access point identifier was provided via the communication 271, and the targeted information component 211 can reference other, external, databases, such as databases maintained by, or on behalf of, the retail establishment, in order to locate targeted information to be presented to user.

In another embodiment, the targeted information component 211 can provide an Application Program Interface (API), or other like interface, to external entities, that can be separate and apart from the retail establishment that provided the wireless access point having the access point identifier referenced by the targeted information component 211. Such external entities can register, such as with the server computing device 110 to be notified when a user's context is determined to include specific aspects or, alternatively, can provide specific targeted information to be provided to a user when their context is determined to include specific aspects. As indicated previously, the association between the access point identifier and an entity that set up that access point, such as a retail establishment, in addition to the information, such as that sent by the communication 181, indicating that a user's wireless computing device has communicationally coupled itself to that access point, can enable the determination that that user's context includes the user having a location proximate to the entity that set up that access point. Consequently, utilizing the above-referenced API, or other interface, other entities can register to provide the user with targeted information when the user's context is so determined. For example, one coffee shop can register to provide coupons to a user whose context includes a location proximate to a rival coffee shop that is in retail competition with the first coffee shop. From the perspective of the user, when they approach one coffee shop, their wireless computing device can automatically notify them of coupons, or other special offers, being offered by a competitive coffee shop.

In addition to the targeted information component 211, a device contact component 212 can reference a device database 112 to obtain contact information for a wireless computing device having the identifier, such as the hashed MAC address, that was received via the communication 181, and then provided to the device contact component 212, via the communication 264, from the initial validation component 210. Thus, as illustrated, the device contact component 212 can provide such identification, such as the hashed MAC address, to the device database 112, via the communication 272, and can receive, from the device database 112, such as via the communication 274, contact information associated with such an identification. As indicated previously, the contact information received, from the device database 112, such as via the communication 274, can comprise a telephone number or other like contact information by which the wireless computing device 140 can be contacted via a mobile communication network 170. In another embodiment, the contact information received, from the device database 112, can comprise a network address, or other like contact information by which the wireless computing device 140 can be contacted via the data network 190. Alternatively, in yet another embodiment, the contact information received from the device database 112 can comprise identification information by which the wireless computing device 140 can be contacted, such as through a specialized contact service that can interact with a specialized application program, or other like computer-executable instructions, executing on the wireless computing device 140.

Once the targeted information component 211 and the device contact component 212 obtained the targeted information and device contact information, respectively, they can provide the same to the targeted information delivery component 220, such as via the communications 281 and 282, respectively, as shown in the system 200 of FIG. 2. The targeted information delivery component 220 can transmit the targeted information, such as the targeted information provided via the communication 281 from the targeted information component 211, to a wireless computing device, such as the wireless computing device 140, that is identified by the contact information that is received via the communication 282 from the targeted information component 211. For example, if the contact information received via the communication 282 indicated a cellular telephone number, the targeted information delivery component 220 can utilize the mobile communication network 170 to send a text message to the wireless computing device 140, such as via the communication 291, by directing the text message to the cellular telephone number in a manner well known to those skilled in the art. As a result, from the perspective of the wireless computing device 140, after the wireless computing device 140 has established the communicational connection 141 with the access point computing device 133 in a retail establishment, a text message application 242 can activate on the wireless computing device 140, informing the user of that wireless computing device of the targeted information, including, for example, of the specials or sales currently being offered by that retail establishment, or of coupons that can be applicable to purchases made at that retail establishment.

As another example, the contact information that is provided to the target information delivery component 220, such as via the communication 282, can be in the form of one or more addresses that are typically utilized to identify computing devices in a data network, such as the data network 190. For example, with reference to the ubiquitous Internet, the contact information provided via the communication 282 can be in the form of one or more Internet Protocol (IP) addresses. Utilizing such addresses, the targeted information delivery component 220 can deliver information, such as to a targeted information application 243, executing on the wireless computing device 140, via communications through the data network 190, such as is illustrated by the communication 292. For example, the targeted information delivery component 220 can initially direct the targeted information to an internetwork routing device that can enable the access point computing device 133 to maintain communicational connectivity with the data network 190. As will be known by those skilled in the art, such internetwork routing device, such as a cable modem or DSL modem, can have a particular address, within the data network 190, assigned to it, and that address can be part of the contact information that the targeted information delivery component 220 receives from the targeted information component 211 and then utilizes to direct the targeted information to the wireless computing device 140. The contact information received and then utilized by the targeted information delivery component 220 can further comprise an internal address by which the wireless computing device 140 can be identified by whatever internetwork routing device enables the wireless computing device 140 to communicate with the data network 190 through the access point computing device 133.

In another embodiment, the contact information that is provided to the target information delivery component 220, via the communication 282, can be in the form of contact information specifying another server computing device, such as one that can be communicationally accessed via the data network 190. A targeted information application, such as the targeted information application 243, executing on the wireless computing device 140, can be specifically configured to periodically communicate with this other server computing device, and obtain therefrom information, such as the targeted information, which that server computing device may have received on behalf of the wireless computing device 140. In such a manner, targeted information can be provided by the target information delivery component, via the data network 190, to the targeted information application 243 executing on the wireless computing device 140. Such an alternative communicational route can, likewise, be represented by the communication 292, illustrated in the system 200 of FIG. 2.

In yet other embodiments, targeted information can be delivered, such as by the targeted information delivery component 220, to the wireless computing device 140, by contacting a manufacturer of wireless computing device 140, a manufacturer of an operating system of the wireless computing device 140, or a programmer of an application, such as the targeted information application 243, that executes on the wireless computing device 140. As will be recognized by those skilled in the art, the manufacturer of the wireless computing device 140 can retain the mechanisms by which it can contact the wireless computing device, as can the manufacturer of operating system software that executes on the wireless computing device 140. Thus, such alternative communicational strategies can, likewise, be represented by the communication 292, as such communications are likely to occur over the data network 190. As before, the communications 291 and 292 are illustrated in FIG. 2 utilizing dashed lines to indicate that they are alternatives of one another.

Figure 3:
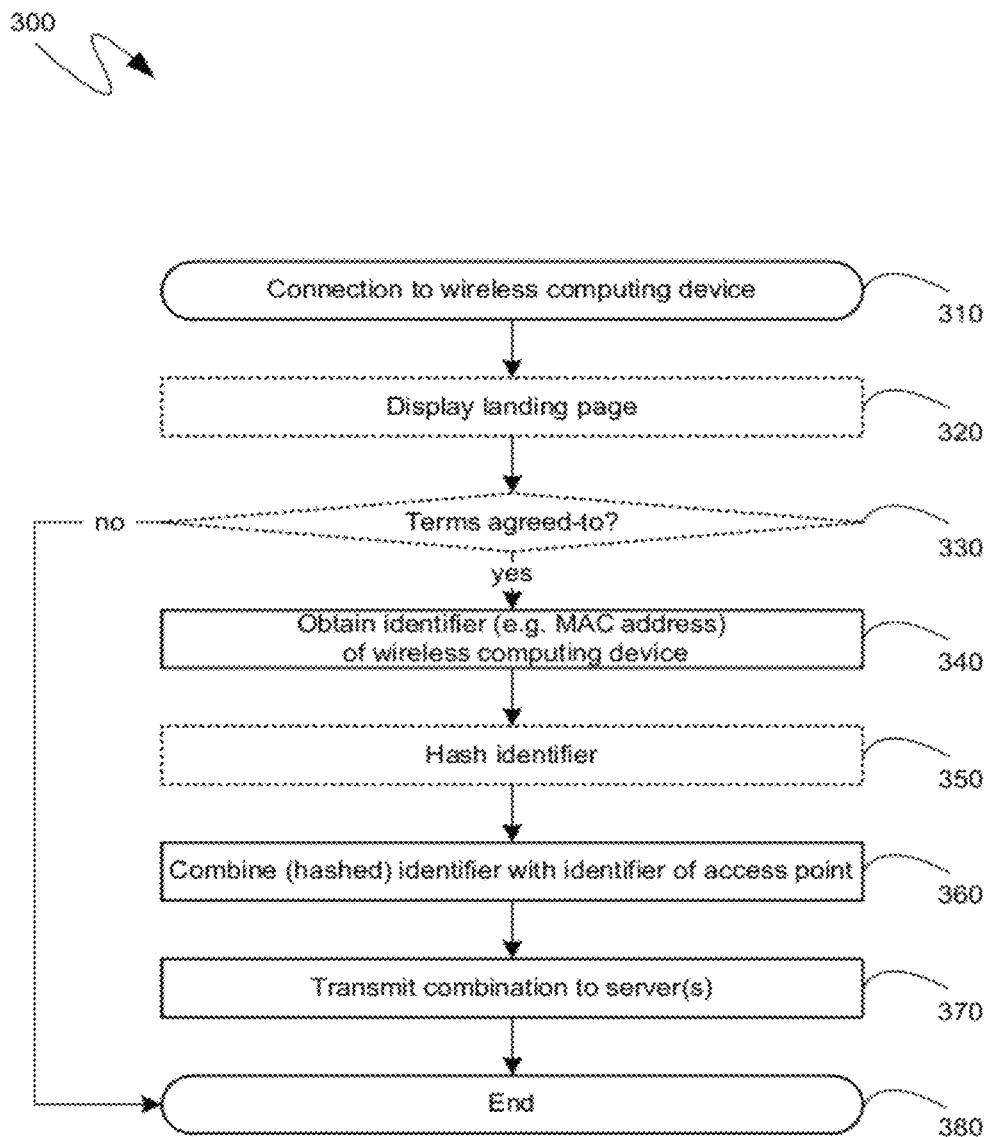
FIG. 3 is a flow diagram of an exemplary operation of a wireless access point computing device.

Turning to FIG. 3, the flow diagram 300 shown therein illustrates an exemplary series of steps that can be performed by an access point computing device to facilitate the presentation of targeted information to users based on their context, and, more specifically based on their context vis-à-vis a retail establishment associated with the targeted information. Initially, as shown by the flow diagram 300 of FIG. 3, an initial communicational connection can be established, at step 310, between the access point computing device and a wireless computing device. Subsequently, at step 320, the access point computing device can, optionally, present a landing page to be displayed via a browser application program, or other like computer-executable instructions, executing on the wireless computing device. In one embodiment, the landing page can include a request for a user's authorization to transmit, or otherwise utilize, information identifying their wireless computing device, such as for the presentation of targeted information. In such an embodiment, at step 330, a determination can be made as to whether the user of the wireless computing device on which the landing page was displayed, at step 320, agreed to the terms presented on the landing page, or otherwise authorized the transmission of an identifier of their wireless computing device. If, at step 330, it is determined that the user did not agree to the terms presented on the landing page, the relevant processing can end at step 380. Alternatively, if, at step 330, it is determined that the user did agree to the terms, processing can proceed with step 340.

The steps 320 and 330 are illustrated in the flow diagram 300 of FIG. 3 with dashed lines to indicate that they are optional. Thus, in one embodiment, after the establishment of the communicational connection to a wireless computing device, such as that at step 310, processing can proceed with step 340, at which point an identifier of the wireless computing device can be obtained. As indicated previously, one such identifier can be a MAC address of the wireless computing device, which can be obtained through existing wireless communication protocols in a manner well known to those skilled in the art. At step 350, the identifier obtained at step 340 can, optionally, be hashed or otherwise obfuscated either, or both, to provide some measure of identity protection and to decrease the amount of information being transmitted. Again, as before, step 350 is illustrated in the flow diagram 300 of FIG. 3 with dashed lines to indicate that it is an optional step.

At step 360, the identifier that was received at step 340, and optionally hash at step 350, can be combined with an identifier of the access point computing device. At step 370, such a combination can be transmitted to a centralized mechanism, such as that implemented by the server computing device 110 shown in the preceding figures. The relevant processing can then end at step 380.

Figure 4:
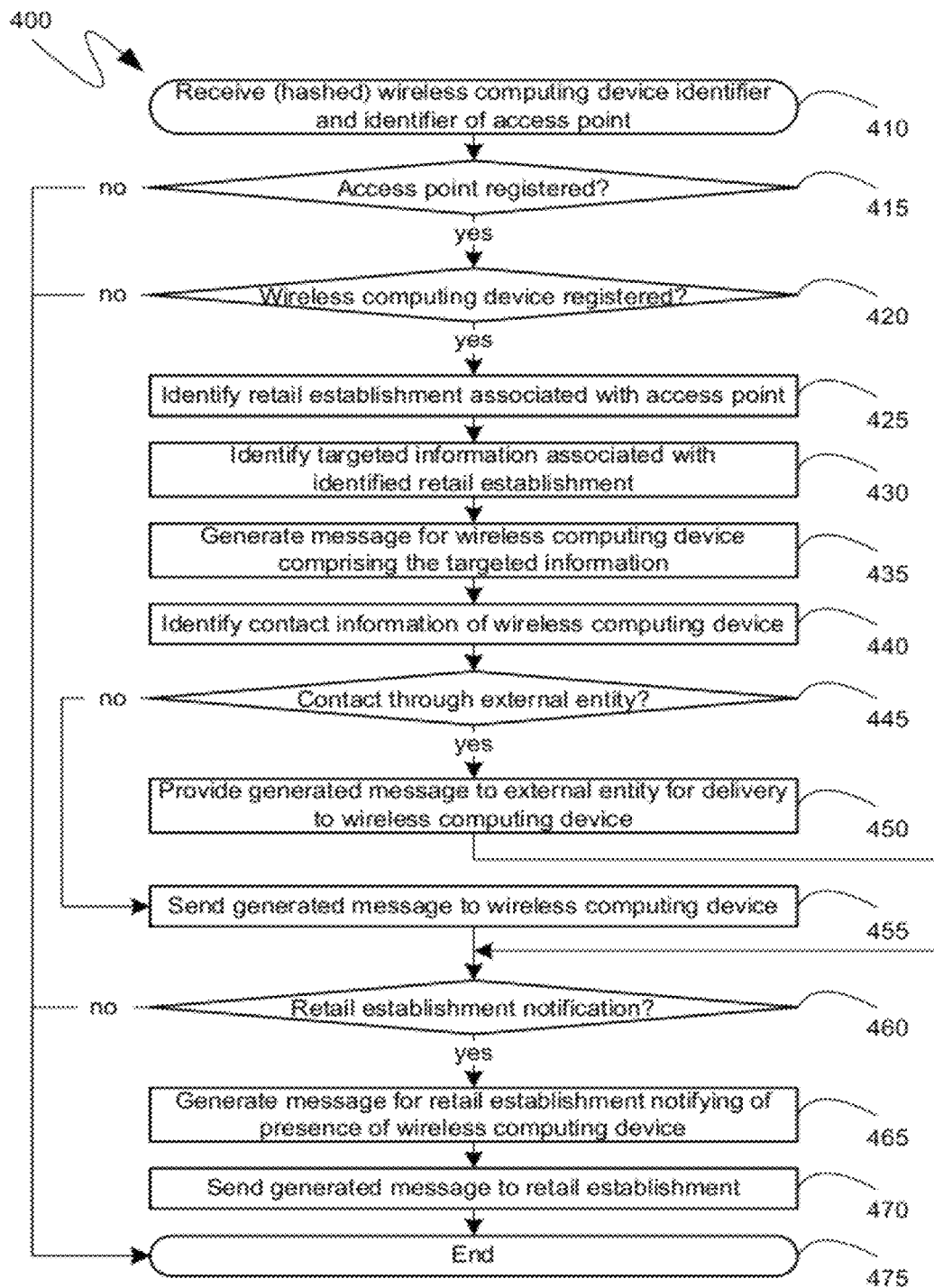
FIG. 4 is a flow diagram of an exemplary operation of one or more server computing devices.

Turning to FIG. 4, the flow diagram 400 shown therein illustrates an exemplary series of steps that can be performed by a centralized mechanism in order to identify and deliver targeted information to a user through a wireless computing device that is communicationally coupled to a wireless access point that can provide the centralized mechanism with an identifier of both itself and the wireless computing device. Initially, at step 410, an identifier of a wireless computing device and an identifier of an access point with which the wireless computing device has established a wireless communication connection, can be received, such as from the wireless computing device. Subsequently, a check can be performed at steps 415 and 420 to verify that the access point associated with the received identifier is registered with the system and, likewise, that the wireless computing device whose identifier was received at step 410 is, also, registered with the system. In another embodiment, the check performed by steps 415 and 420 need not be performed initially and can, instead, be performed as part of the steps 425 and 440, which will be described in further detail below.

In an embodiment in which an initial check is performed, such as by steps 415 and 420, a determination, by either of those steps that either the access point or the wireless computing device is not registered and, thus, unknown to the centralized system, processing can proceed to step 475 and the relevant processing can end. Alternatively, if the steps 415 and 420 indicate that the access point and the wireless computing device are, in fact, registered, or if such steps are not explicitly performed, processing can proceed with step 425 at which point an identification of a retail establishment associated with the access point whose identifier was received at step 410 can be performed. As indicated previously, in one embodiment, retail establishments can register one or more access points that are to be established by that retail establishment for purposes of providing wireless network functionality to the customers of that retail establishment. Such a registration can associate those access points, and, more specifically, their identifiers, with the retail establishment that has set up those access points.

In one embodiment, the association between an access point and a retail establishment can be monitored to avoid potential confusion, such as if one retail establishment sold an access point which was then, subsequently, utilized by another, different, retail establishment or, alternatively, by an individual or a business entity. In such an embodiment, although not specifically illustrated by the steps of the flow diagram 400 of FIG. 4, if an identifier of an access point is not received, such as at step 410, for a sufficiently long period of time, a message can be sent, either to that access point, or to the retail establishment associated with that access point, to verify that that access point is, indeed, still associated with that retail establishment. Alternatively, as part of the step 425, if the association between a retail establishment of an access point upon which the identification of step 425 is based has not been utilized for a sufficiently long period of time, a message can be sent, either to the access point, or to the retail establishment associated with the access point, to verify that the access point is, in fact, still associated with that retail establishment.

Returning to the flow diagram 400 of FIG. 4, once a retail establishment is identified at step 425, a user of the wireless computing device can be determined to have a context that includes that users proximity to that retail establishment. Consequently, at step 430, targeted information associated with the retail establishment identified at step 425 can, itself, be identified. Subsequently, at step 435, a message for the wireless computing device, whose identity was received at step 410, can be generated. In one embodiment, the message generated at step 435 can comprise the targeted information, or information by which the user can access the targeted information, such as, for example, a link, pointer, or other like identifier through which the user can be displayed the targeted information. For example, the message generated at step 435 can be a text message, such as could be delivered over a cellular telephone network, and can comprise a limited number of characters, typically delivered without formatting. Such a message, generated at step 435, could merely comprise a link to, for example, a World Wide Web page. A user selecting that link, such as on a cellular telephone having Internet browsing capabilities, could be directed to a webpage whose rich graphical and hypermedia content can present the targeted information that was identified at step 430 in a more visually appealing, and more richly formatted, manner.

At step 440, the identification of the wireless computing device received at step 410 can be utilized to find contact information for that wireless computing device. Subsequently, at step 445, a determination can be made as to whether the contact information identified at step 440 specifies an external entity which can then, in turn, contact the wireless computing device utilizing its own mechanisms. If, at step 445, it is determined that the contact information received at step 440 does indicate such an external entity, then, at step 450, the message generated at step 435 can be provided to that external entity, along with instructions to deliver that generated message to the wireless computing device, such as, for example, by identifying that wireless computing device appropriately to that external entity. If, however, the determination at step 445 indicates that the contact information received at step 440 enables contact of the wireless computing device directly, then, processing can proceed to step 455, at which point the message generated at step 435 can be directly sent to the wireless computing device, such as, for example, by sending a text message to the wireless computing device.

Whether the message generated at step 435 is sent directly to the wireless computing device, such as at step 455, or is provided to an external entity, such as at step 450, processing can proceed with step 460, at which point determination can be made as to whether the retail establishment that was identified at step 425 has requested that it be notified of the presence of one of its customers proximate to its location. If, at step 460, it is determined that the retail establishment requested no such notification, then the relevant processing can end at step 475. Conversely, however, if, at step 460, it is determined that the retail establishment did request such notification then, at step 465, a message to the retail establishment, notifying them of the presence of the wireless computing device identified with the identifier received at step 410, can be generated at step 465. Subsequently, the generated message can be sent to the retail establishment at step 470. The relevant processing then end at step 475.

Although illustrated as occurring in serial, those of skill in the art world recognize that certain ones of the steps of the flow diagram 400 of FIG. 4 can be performed in parallel. For example, the identification of the retail establishment and targeted information, and the generation of the message, at steps 425, 430 and 435 can be performed in parallel with some of the steps indicated as occurring subsequent to those steps, such as, for example, steps 440 and 445. Similarly, the determination at step 460, and subsequent message generation and transmission at steps 465 and 470, can be performed in parallel to some or all of the steps 430 through 455. Consequently, as can be seen, the specific ordering of the steps of the flow diagram 400 of FIG. 4 are meant to be exemplary, and are not required to be in the order illustrated.

Figure 5:
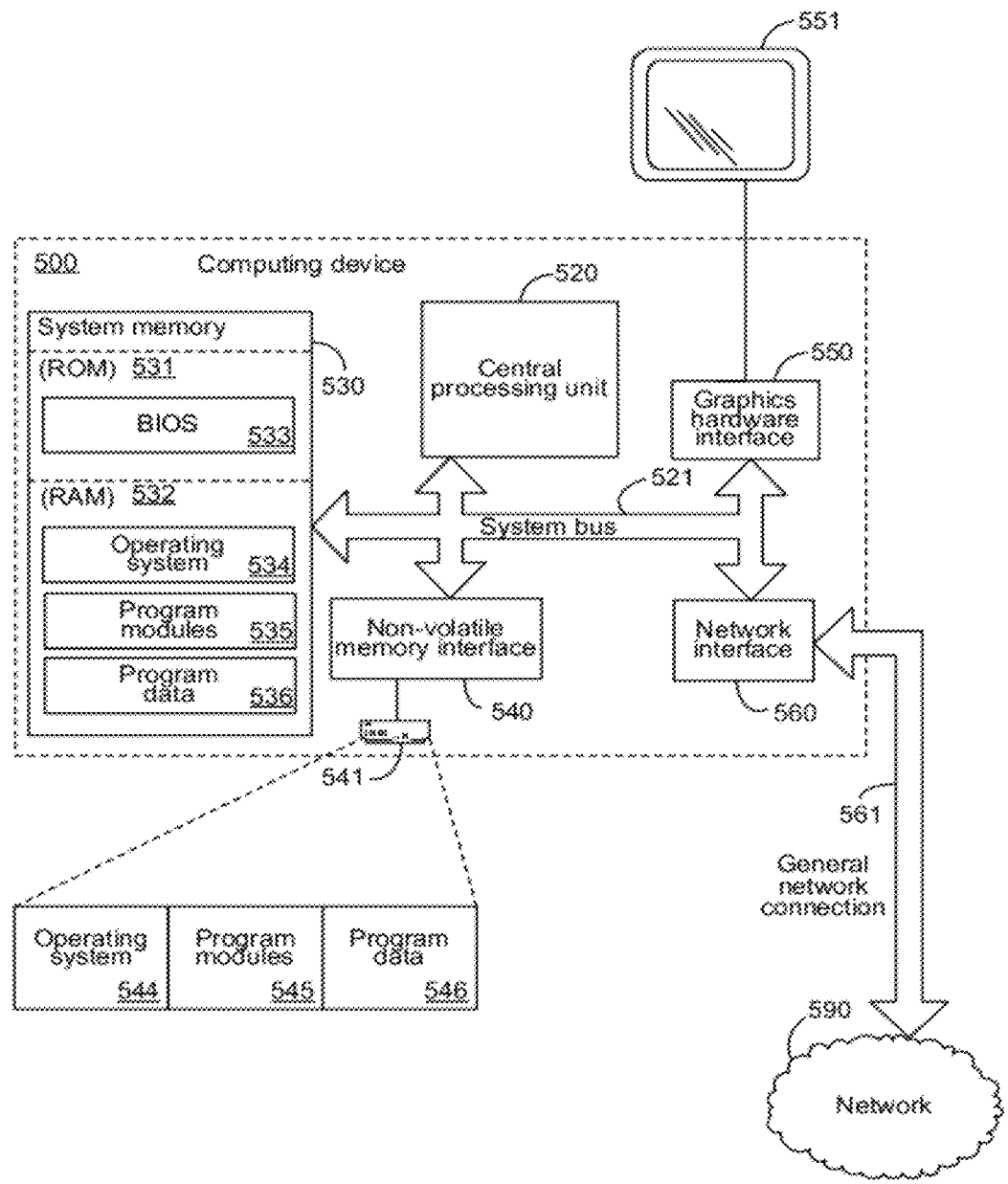
FIG. 5 is a block diagram of an exemplary computing device.

Turning to FIG. 5, an exemplary computing device 500 is illustrated. The exemplary computing device 500 can be any one or more of the computing devices illustrated in FIGS. 1 and 2, including general purpose computing devices, such as the wireless computing device 140 and the server computing device 110, and also including dedicated computing devices, such as the access point computing devices 131, 132 and 133. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of a user interface, especially within the case of a general purpose computing device. Dedicated computing devices, such as an access point, may not comprise a display 551, per se, but they often comprise other visual user feedback hardware, such as Light Emitting Diodes (LEDs) and the like. The graphics hardware can include, but is not limited to, a graphics hardware interface 550 and a display device 551. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536. As will be recognized by those skilled in the art, in dedicated computing devices, a single cohesive set of computer-executable instructions directed to the performance of the tasks to which the dedicated computing device is dedicated can comprise the operating system 534 and the program modules 535 and program data 536.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to a general network connection 561 through a network interface or adapter 560 that is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above descriptions, mechanisms for sending targeted information based on a user's context as determined by their association with a wireless network have been presented. In view of the many possible variations of the subject matter described herein, we claim as our invention all such embodiments as may come within the scope of the following claims and equivalents thereto.

We claim:

1. One or more computer-readable memory comprising computer-executable instructions for determining a user's context based on a wireless network to which a computing device being utilized by the user is communicationally coupled, the computer-executable instructions directed to steps comprising:
  receiving, from a first access point, a first communication comprising an identification of the first access point and an identification of the computing device communicationally coupled to a first wireless network being provided by the first access point;
  determining a first entity associated with the first access point;
  determining a contact information for the computing device;
  determining a first context of the user to comprise the user's proximity to the first entity;
  obtaining, based on the determined first context of the user, a first targeted information to be presented to the user;
  communicating the first targeted information to the user;
  receiving, from a second access point that is independent of and different from the first access point, a second communication comprising an identification of the second access point and the identification of the computing device, the computing device being communicationally coupled to a second wireless network subsequent to its communicational coupling to the first wireless network, the second wireless network being provided by the second access point, the second wireless network being independent of and different from the first wireless network;
  determining a second entity, independent of the first entity, associated with the second access point;
  determining a second, subsequent, context of the user to comprise the user's proximity to the second entity;
  subsequently obtaining, based on the determined second, subsequent context of the user, a second targeted information to be presented to the user; and
  subsequently communicating the second targeted information to the user.

2. The computer-readable memory of claim 1, wherein the identification of the computing device is a hashed MAC address.

3. The computer-readable memory of claim 1, wherein the computer-executable instructions for determining the first entity and the second entity comprise computer-executable instructions for referencing an access point database comprising associations between access points and entities that were provided by the entities as part of a registration.

4. The computer-readable memory of claim 3, comprising further computer-executable instructions for identifying another access point for which an identification has not been received within a predetermined time period; determining an entity associated with the other access point; and contacting the entity to verify the association between the entity and the other access point.

5. The computer-readable memory of claim 1, wherein the computer-executable instructions for obtaining the first and the second targeted information comprise computer-executable instructions for utilizing the received identification of the first access point to obtain the first targeted information from an access point database, the first targeted information having been provided to the access point database by the first entity associated with the first access point; and utilizing the received identification of the second access point to obtain the second targeted information from the access point database, the second targeted information having been provided to the access point database by the second entity associated with the second access point.

6. The computer-readable memory of claim 1, wherein the computer-executable instructions for obtaining the first targeted information comprise computer-executable instructions for: notifying an entity, independent of the first entity, of the determined first context of the user; and receiving from the entity, in response to the notifying, the first targeted information.

7. The computer-readable memory of claim 1, wherein the first targeted information comprises at least one of: a retail special offer from the first entity or a retail special offer from a retail competitor to the first entity.

8. The computer-readable memory of claim 1, wherein the first targeted information is transmitted to the user via a text message transmitted independently of the communicational coupling between the first access point and the computing device.

9. The computer-readable memory of claim 1, wherein the first targeted information is transmitted to the user via an application program, executing on the computing device, specifically dedicated to the receipt of targeted information.

10. The computer-readable memory of claim 1, comprising further computer-executable instructions for communicating, to the first entity, a notification that the user is proximate to the first entity when the first context of the user is determined.

11. A system for determining a user's context based on a wireless network to which a computing device being utilized by the user is communicationally coupled, the system comprising:
multiple wireless access points, each configured to perform steps comprising: providing a wireless network independent of wireless networks provided by others of the multiple wireless access points; establishing a communicational connection with the computing device; obtaining an identifier of the computing device; and generating a communication comprising: the obtained identifier of the computing device and an identifier of the wireless access point; and
one or more server computing devices configured to perform steps comprising: receiving the generated communications from at least two of the multiple wireless access points in a consecutive manner; determining entities associated with the at least two of the multiple wireless access points; determining a contact information for the computing device; determining consecutive contexts of the user to comprise the user's proximity to the entities; obtaining, based on individual determined contexts of the user, targeted information to be presented to the user; and communicating the targeted information to the user.

12. The system of claim 11, wherein at least some of the multiple wireless access points are further configured to provide a landing page to the computing device, the landing page requesting authorization to generate the communication; wherein the generating the communication is only performed if the authorization is received.

13. The system of claim 11, wherein the communicating the targeted information to the user comprises communicating, independently of the communicational coupling between a one of the multiple access points and the computing device, a text message comprising an indication of the targeted information to the computing device.

14. The system of claim 11, wherein the one or more server computing devices are further configured to communicate, to the entities, a notification that the user is proximate to a one of the entities when a one of the user's consecutive contexts is determined to comprise the user's proximity to the one of the entities.

15. The system of claim 11, wherein the targeted information communicated to the user is targeted information of an entity differing from the entities associated with the at least two of the multiple wireless access points.

16. A method of determining a user's context based on a wireless network to which a computing device being utilized by the user is communicationally coupled, the method comprising the steps of:
receiving, from a first access point, a first communication comprising an identification of the first access point and an identification of the computing device communicationally coupled to a first wireless network being provided by the first access point;
determining a first entity associated with the first access point;
determining a contact information for the computing device;
determining a first context of the user to comprise the user's proximity to the first entity;
obtaining, based on the determined first context of the user, a first targeted information to be presented to the user;
communicating the first targeted information to the user;
receiving, from a second access point that is independent of and different from the first access point, a second communication comprising an identification of the second access point and the identification of the computing device, the computing device being communicationally coupled to a second wireless network subsequent to its communicational coupling to the first wireless network, the second wireless network being provided by the second access point, the second wireless network being independent of and different from the first wireless network;
determining a second entity, independent of the first entity, associated with the second access point;
determining a second, subsequent, context of the user to comprise the user's proximity to the second entity; subsequently obtaining, based on the determined second, subsequent context of the user, a second targeted information to be presented to the user; and
subsequently communicating the second targeted information to the user.

17. The method of claim 16, wherein the first targeted information is transmitted to the user via a text message transmitted independently of the communicational coupling between the first access point and the computing device.

18. The system of claim 11, further comprising an access point database comprising associations between access points and entities that were provided by the entities as part of a registration; wherein the determining the entities performed by the one or more server computing devices is performed by referencing the access point database.

19. The method of claim 16, wherein the determining the first entity and the determining the second entity each comprise referencing an access point database comprising associations between access points and entities that were provided by the entities as part of a registration.

20. The method of claim 16, wherein the obtaining the first targeted information comprises: notifying an entity, independent of the first entity, of the determined first context of the user; and receiving from the entity, in response to the notifying, the first targeted information.

* * * * *